Jan. 30, 1934.  E. BENEDEK  1,945,391
PUMP
Filed July 17, 1931  2 Sheets-Sheet 1
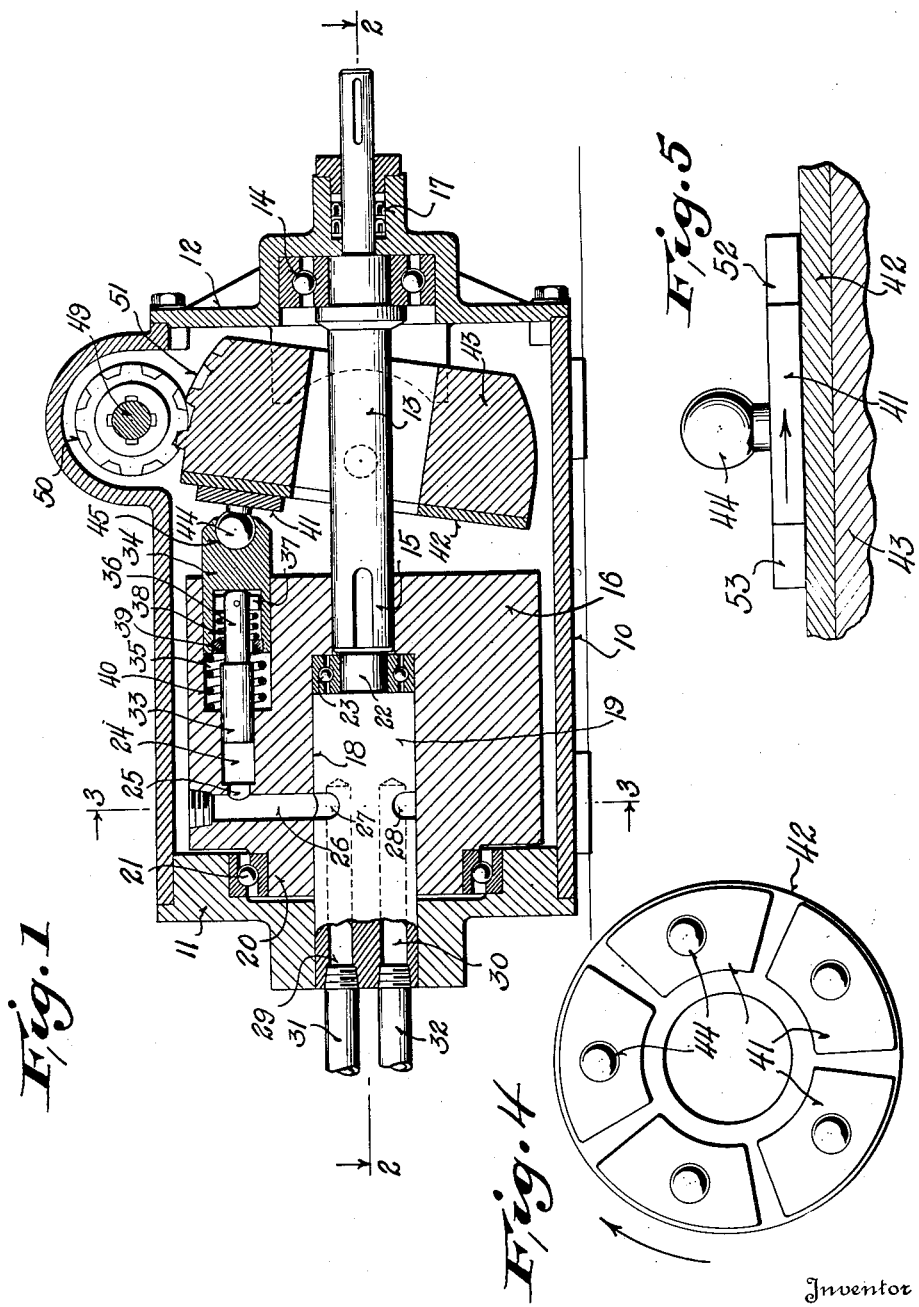
Inventor
Elek Benedek
By
Attorney

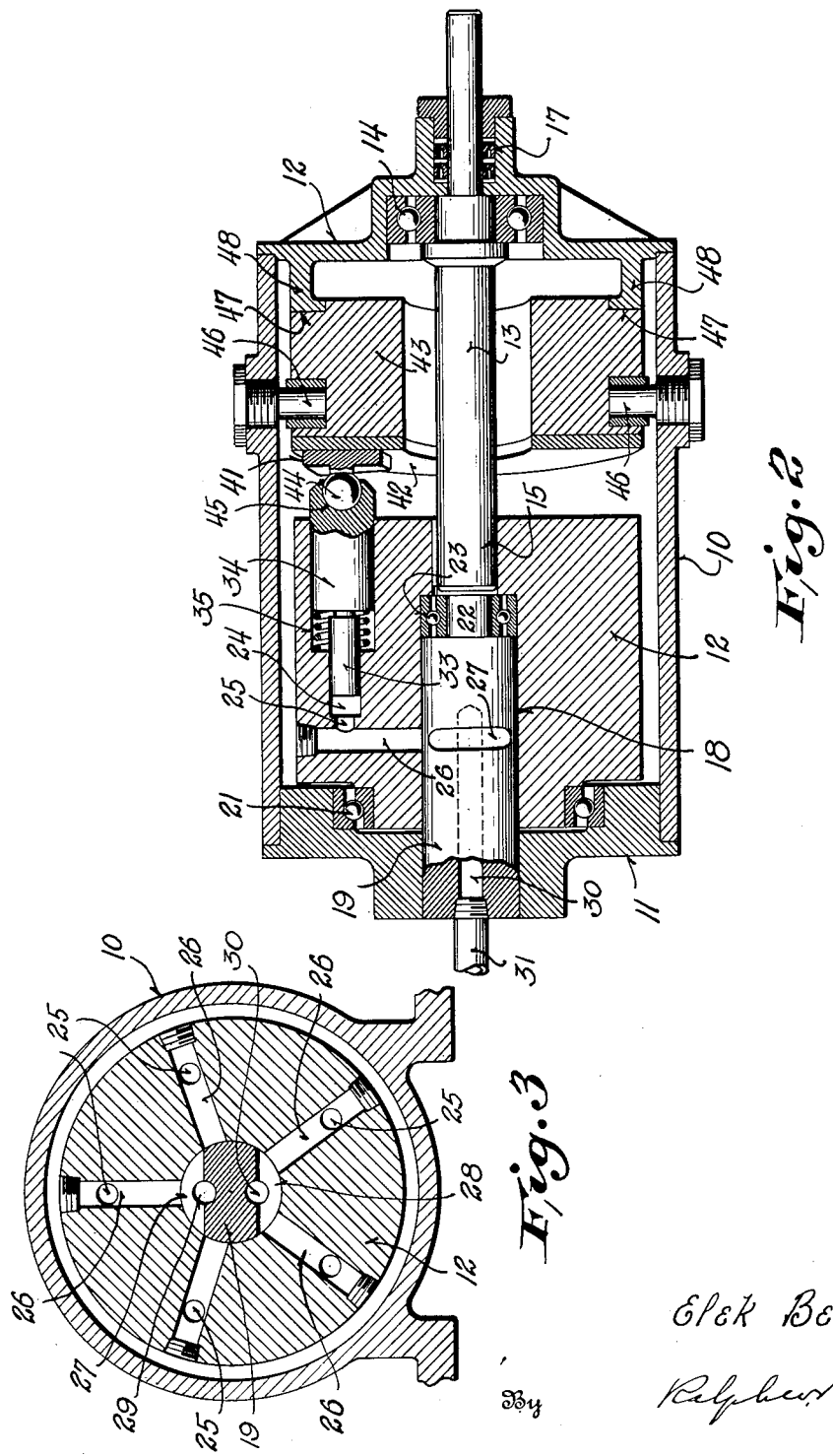

Patented Jan. 30, 1934

1,945,391

UNITED STATES PATENT OFFICE 1,945,391

PUMP

Elek Benedek, Mount Gilead, Ohio, assignor to The Hydraulic Press Manufacturing Company, Mount Gilead, Ohio, a corporation of Ohio Application July 17, 1931. Serial No. 551,414

7 Claims. (Cl. 103—162)

This invention relates to high speed, high pressure, rotary pumps of the parallel piston type.

Pumps of the type referred to ordinarily comprise a driven cylinder barrel rotatable about a fixed axis and carrying a series of pistons disposed about said axis and reciprocable parallel thereto. As heretofore designed commercial forms of pumps of the character mentioned also include a driven swash plate connected with the pistons and rotatable in unison with the cylinder barrel about an axis inclined to the axis of rotation of the cylinder barrel, the swash plate being supported by a tiltable yoke adjustable to vary the inclination and to thereby vary the piston stroke. Such construction necessitates a universal joint through which the swash-plate is driven, and also an anti-friction bearing of the ball or roller type between the swash plate and yoke to sustain the heavy piston thrusts without undue friction losses.

One object of the present invention is the provision of a pump of the type mentioned so designed as to make possible the elimination of the anti-friction bearings above referred to.

Another object is the provision of a pump of the type mentioned so designed as to make possible the elimination of the universal joint heretofore required.

Another object is the provision in a pump of the type mentioned of novel means for sustaining the piston reactions in such manner as to eliminate all transverse or cross thrusts thereon to thereby eliminate the eccentric wear on piston and cylinder walls so common in pumps of this type heretofore designed.

Other more specific objects and advantages will appear from the following description of an illustrative embodiment of the present invention.

In the accompanying drawings:—

Figure 1 is an axial sectional view of a pump constructed in accordance with the present invention.

Fig. 2 is an axial sectional view taken in a plane at right angles to that of Fig. 1.

Fig. 3 is a transverse sectional view on the line 3—3 of Fig. 1.

Fig. 4 is a face view of the bearing ring illustrating the arrangement of the piston bearing shoes thereon.

Fig. 5 is side elevation on a larger scale of a piston bearing shoe and bearing ring, illustrating the relation therebetween.

The pump selected for illustration is enclosed within a leak-proof casing comprising a substantially cylindrical shell 10 closed by end heads 11 and 12. A drive shaft 13, supported in appropriate antifriction bearings 14 in the end head 12, projects into the casing and is keyed or otherwise fixed at its inner end 15 to a rotatable cylinder barrel 16. Appropriate packing 17 prevents escape of liquid from the housing 10 by way of the shaft 13.

The cylinder barrel 16 is provided with a central axial bore 18 to receive the inner end of a stationary pintle 19 securely anchored in the end head 11. One end of the cylinder barrel is reduced to provide a hub 20 rotatably supported by a radial end thrust anti-friction bearing 21, preferably of the ball type. The inner end of the pintle 19 is reduced, as at 22, to provide a support for an anti-friction bearing 23 on which the cylinder barrel rotates.

The cylinder barrel contains a series of cylinder bores, one of which is shown at 24, symmetrically arranged about the axis thereof and extending parallel to said axis. Each cylinder bore communicates through a port 25 with a radial passage 26 leading to the central bore 18, as indicated particularly in Fig. 3. Passages 26 are arranged to register alternately with ports 27 and 28 formed in the opposite sides of the pintle 19 and communicating respectively with longitudinal passages 29 and 30 formed in the pintle. Passages 29 and 30 communicate respectively with pipes 31 and 32 constituting the opposite sides of a hydraulic circuit.

A piston or plunger 33 is reciprocable in each bore 24 and is actuated by a cylindrical driving head 34 guided within an enlargement 35 of the bore. Each plunger is preferably flexibly connected to its driving head in such manner that each plunger is free to center itself within its bore. In this instance each head 34 is socketed to receive a shank 36 on the plunger, and to accommodate a collar 37 fixed to the end of the shank. A spring 38 interposed between the collar 37 and an anchor ring 39, removably fixed in the socket, retains the end of the shank 36 against the end wall of the socket. A spring 40, within the enlarged bore 35 acts on the head 34 in such direction as to retract the plunger 33.

The driving head 34 of each of the pump plungers 33 carries at its outer end a bearing shoe 41 for coaction with a stationary bearing ring 42 carried by a tiltable yoke 43 to be later described. Each bearing shoe 41 is connected to its supporting head 34 through an appropriate thrust transmitting joint designed to permit free angular movement therebetween in all directions. The joint shown for this purpose comprises a ball 44 rigidly mounted on the shoe 41 and closely fitted within a socket 45 formed in the end of the head 34 for a purpose which will hereinafter appear. The ball 44 is disposed at one side of the midpoint of the shoe 41 so that the load transmitted from the head 34 is eccentrically applied to the shoe.

The tiltable yoke 43 comprises a heavy ring surrounding the shaft 13 and rockably supported primarily by a pair of trunnions 46 removably fixed in the housing 10 and journalled in appropriate sockets formed in the sides of the yoke. The yoke is also equipped with arcuate shoulders 47 seated in arcuate bearing members 48 carried by the end head 12. The shoulders 47 and bearing members 48 are curved concentrically with respect to the trunnions 46 so as to permit free rocking of the yoke about the axis of the trunnions, the bearing members 48 serving to sustain the thrust transmitted to the yoke from the pump plungers.

Control mechanism of conventional form is provided for adjusting the yoke 43, and in this instance this mechanism includes a control shaft 49 journalled in the housing and carrying a spiral pinion 50 which meshes with spiral teeth 51 formed on the side of the yoke. The arrangement is such that upon rotating the shaft 49 in one direction or the other, the yoke may be tilted about the axis of the trunnions in one direction or the other to vary the inclination of the bearing ring 42 with respect to the axis of the drive shaft 13, and to thereby vary the stroke of the pump plungers 33 during their circular travel about the axis of the drive shaft.

The pump housing is maintained full of oil so that the face of the bearing ring 42 is always bathed in oil. The drive shaft 13 is driven at constant speed in one direction so that the several bearing shoes 41 travel about the bearing ring 42 in a clockwise direction (Fig. 4) and in the direction as indicated by the arrow in Fig. 5. As indicated in these figures the ball 44 on each shoe is disposed further from the leading end 52 of the shoe than from the trailing end 53 thereof, so as to effect an unequal distribution of the load thereon with the greater portion of the load carried by the trailing end of the shoe. Due to this unequal distribution of load, the shoe 41 in advancing over the lubricated surface of the bearing ring 42 tends to produce and maintain a wedge-like film of oil therebetween, which sustains the load and provides a substantially frictionless bearing between those surfaces.

The pump functions in a well known manner. Due to the inclination of the bearing ring 42, each piston 33, during half of its circular travel about the axis of the shaft 13, is forced inwardly or to the left, and during the remaining half of this circular travel each piston is forced outwardly or to the right by the action of the spring 40, the spring 40 serving to hold the bearing shoe 41 against the bearing ring 42 throughout the cycle. During the inward or working stroke of each piston 33, liquid is forced by it from the bore 24 through passage 26 and port 27 into and through passage 29 in the pintle; and during the inward or suction stroke of each piston 33, liquid from the pintle passage 30 passes through passage 26 into the cylinder bore 24.

It will thus be noted that I have provided a pump of simple and economical design and one which will withstand heavy duty service for long periods of time without excessive wear. Due to the absence of any cross thrust upon the several plungers 33 eccentric wear on the plungers and cylinder walls is eliminated, and due to the eccentric loading of the shoes 41 together with the ample supply of lubricant maintained on the bearing ring 42 wearing friction between those elements has been practically eliminated.

Various changes may be made in the embodiment of the present invention hereinabove specifically described without departing from the invention as defined in the appended claims.

I claim:—

1. In a device of the character described the combination of a cylinder barrel rotatable about a fixed axis and having a plurality of substantially parallel cylinders therein disposed about said axis, pistons longitudinally reciprocable in said cylinders, a non-rotatable bearing ring surrounding said axis, a head having a resilient connection to each piston and a separate bearing shoe having a flexible connection with each head and reacting against said ring to sustain the piston thrust, each connection being disposed eccentrically of its associated shoe whereby said shoes coact with said ring to form and maintain a load sustaining oil film therebetween during rotation of said cylinder barrel, said resilient connection consisting of a pair of springs, one of said springs surrounding one end of each piston and having one of its ends seated upon an interior portion of each head, and its other end connected to each piston end, and said other spring having one of its ends in abutting relation to one end of each head.

2. In a device of the character described the combination of a circular series of parallel piston and cylinder assemblies mounted for circular travel about a central axis, a non-rotatable bearing ring surrounding said axis, a series of bearing shoes coacting with said ring, a series of hollow heads connected to said shoes, each head having a resilient connection with each piston, said resilient connection consisting of a pair of springs, one of said springs surrounding at least a portion of each piston and having one of its ends seated upon an interior portion of each head, and means connecting its other end to each piston end, and said other spring having one of its ends in abutting relation to one end of each head.

3. In a device of the character described the combination of a circular series of parallel piston and cylinder assemblies mounted for circular travel about a central axis, a corresponding series of bearing shoes, a series of hollow heads connected to said shoes, and a resilient connection between each piston and head consisting of a pair of springs, one of said springs surrounding one end of each piston and having one of its ends seated upon an interior portion of each head, and means connecting its other end to each piston end, and said other spring having one of its ends in abutting relation to one end of each head, a non-rotatable bearing ring surrounding said axis and coacting with said shoes to sustain the thrust of said assemblies and to form a load-sustaining oil film therebetween, and a support for said ring adjustable to vary the angular relation between said ring and said axis.

4. In a device of the character described the combination of a cylinder barrel rotatable about a fixed axis and having a circular series of parallel cylinder bores therein, a piston reciprocable in each bore, a driving element for each piston, said driving elements being guided in said cylinder barrel, a resilient thrust transmitting connection between each of said elements and its associated piston, said resilient connection consisting of a pair of springs, one of said springs surrounding one end of each piston and having one of its ends seated upon an interior portion of each driving element and its other end connected to each piston end, and said other spring having one of its ends in abutting relation to one end of each driving element.

5. In a device of the character described the combination of a cylinder barrel rotatable about a fixed axis and having a circular series of parallel cylinder bores therein, a piston reciprocable in each bore, a socketed driving means for each piston guided in said cylinder barrel, a shank on each piston loosely engaged within the socket of its associated driving element, a spring having means for connecting one of its ends to each piston end and having its other end in abutting relation with an interior portion of said socketed driving means, a reaction element, and a second spring having one of its ends engaged with the end wall of said last named socket and its opposite end in abutting relation with the end of each socketed driving means for forcing said element and its associated piston into driving relation with said reaction element.

6. In a device of the character described, the combination of a circular series of parallel piston and cylinder assemblies, a series of driving heads, each of said driving heads having a hollow interior into which extends one end of a piston, and a resilient connection between each piston and each driving head consisting of a pair of springs, one of said springs surrounding said piston, and located within the hollow interior portion of a head, means for connecting one of said spring ends to said piston, said spring having its other end seated in abutting relation with an interior portion of said head, said other spring having one of its ends in abutting relation to one end of each head, and a bearing ring coacting with said heads to take the thrust of said pistons.

7. In a device of the character described, the combination of a circular series of parallel piston and cylinder assemblies, a series of driving heads having hollow interior portions, means for forcing the end of each piston into abutting relation with the end of each of the hollow interior portions of each of said heads consisting of a spring having one of its ends connected to a piston and its other end seated upon an interior portion of said head, a bearing ring, means for forcing said heads in the direction of said bearing ring consisting of a series of springs, each spring having one of its ends in abutting relation with one end of each head, and means for holding its other end in fixed position, and said bearing ring coacting with said heads to take the thrust of said pistons.

ELEK BENEDEK.